United States Patent
Raaymakers et al.

(10) Patent No.: US 7,688,339 B2
(45) Date of Patent: Mar. 30, 2010

(54) SYSTEM FOR SCRIBING A VISIBLE LABEL

(75) Inventors: Jeroen Arnoldus Leonardus Johannes Raaymakers, Eindhoven (NL); George Alois Leonie Leenknegt, Eindhoven (NL); Jan Verbiest, Geel (BE); Igolt Pieter Douwes Ubbens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 447 days.

(21) Appl. No.: 11/721,550

(22) PCT Filed: Dec. 21, 2005

(86) PCT No.: PCT/IB2005/054353

§ 371 (c)(1),
(2), (4) Date: Jun. 13, 2007

(87) PCT Pub. No.: WO2006/067755

PCT Pub. Date: Jun. 29, 2006

(65) Prior Publication Data

US 2009/0237486 A1 Sep. 24, 2009

(30) Foreign Application Priority Data

Dec. 23, 2004 (EP) ................... 04106927

(51) Int. Cl.
*B41J 2/47* (2006.01)
(52) U.S. Cl. .................................... 347/225
(58) Field of Classification Search .............. 347/224, 347/225; 369/13.11, 13.12, 53.23, 53.26
See application file for complete search history.

(56) References Cited

U.S. PATENT DOCUMENTS

| 5,249,168 | A | * | 9/1993 | Kagami et al. | 369/44.27 |
| 5,402,400 | A | * | 3/1995 | Hamada et al. | 360/78.06 |
| 5,970,033 | A | * | 10/1999 | Nakano et al. | 369/44.29 |
| 7,139,232 | B2 | * | 11/2006 | McClellan | 369/100 |
| 7,443,410 | B2 | * | 10/2008 | McClellan et al. | 347/224 |
| 2002/0167877 | A1 | | 11/2002 | Chen | |
| 2002/0191517 | A1 | | 12/2002 | Honda et al. | |
| 2004/0141046 | A1 | | 7/2004 | Hanks | |

FOREIGN PATENT DOCUMENTS

| EP | 1471529 A2 | 10/2004 |
| JP | 11213398 A | 8/1999 |
| WO | WO03083850 A2 | 10/2003 |
| WO | WO2004013848 A1 | 2/2004 |
| WO | WO2006006102 A1 | 1/2006 |

* cited by examiner

*Primary Examiner*—Hai C Pham

(57) ABSTRACT

A device is for scribing a visible label on the medium. The medium (11), for example an optical disc, has a label side provided with a radiation sensitive layer for creating the visible label via a beam of radiation. The device has a head (22) and a positioning unit (25) for radially positioning a scribing spot, which unit has a course positioning system by movements of the head and a fine positioning system. The device has a generator unit (32) for, during at least one boundary trace of the substantially parallel traces which precedes or succeeds a head movement, temporarily applying a broadening signal (35) to the fine positioning system for broadening the boundary trace in the transverse direction. This has the advantage that unwritten annular areas called white bands, which may occur due to mismatch of the head movement and the fine positioning system, are reduced or prevented.

8 Claims, 3 Drawing Sheets

SYSTEM FOR SCRIBING A VISIBLE LABEL

Figure 1A:
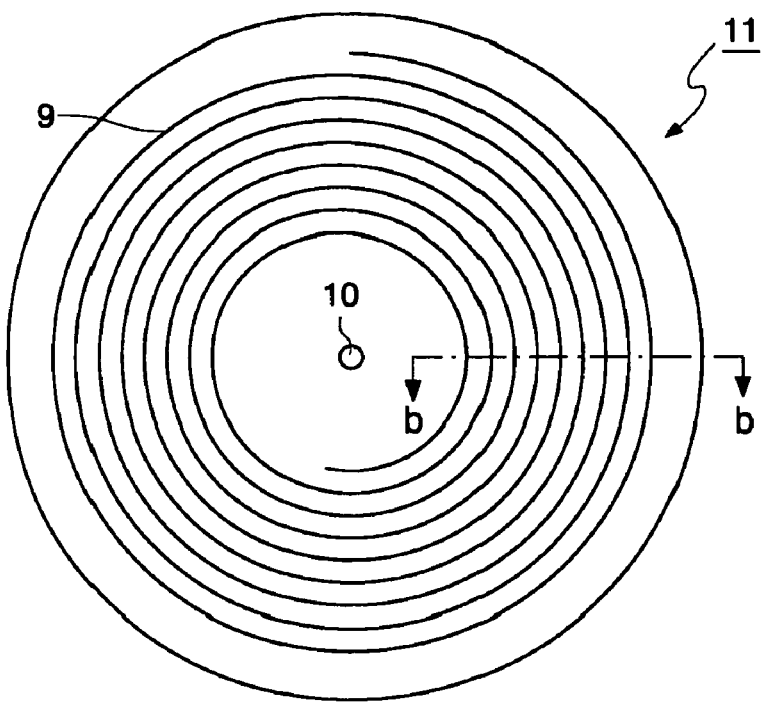

The invention relates to a device for scribing a visible label on a medium, the medium having a label side provided with a radiation sensitive layer for creating the visible label by scribing a pattern of substantially parallel traces of dots via a beam of radiation, the device comprising a head for providing the beam of radiation for generating a scribing spot on the radiation sensitive layer for scribing the visible label, a control unit comprising label control means for controlling the scribing in dependence of label data, and positioning means for positioning the scribing spot in a transverse direction that is transverse to a longitudinal direction of the traces of dots, which positioning means comprise course positioning means for course positioning the scribing spot in the transverse direction by movements of the head and fine positioning means for fine positioning the scribing spot in the transverse direction.

The invention further relates to a method of scribing a visible label on a medium via a beam of radiation for use in the scanning device.

The patent application US 2002/0191517 describes an optical disc device and a method of printing a label on an optical disc. The label is created by utilization of a laser beam output from a head of the optical disc device. It is noted that in the current document the word scribing is used for indicating the process of changing the visible light characteristic of a radiation sensitive layer for creating a visible label on a medium, e.g. for printing a text on an optical disc.

In optical recording devices information is stored on a record carrier by writing marks in a track. The optical recording device is equipped with a head to focus a laser beam into a scanning spot on a track on a recording layer of the record carrier. The head is positioned in a transverse direction on the track via a positioning system based on a radial error signal derived from radiation reflected from the track. Subsequently fine positioning of the scanning spot on the track is achieved by controlling one of the optical elements in the head, e.g. via a coil driven actuator. It is to be noted that course and fine radial positioning are based on the radial error signal from the track.

In the known document scribing a label via the head of an optical recording device is described. A visible light characteristic changing layer formed from photosensitive or heat-sensitive material, i.e. material that is sensitive to the radiation from the beam, is formed in a location which can be viewed from a part of a label surface of an optical disk. The optical disk is set on a turntable of an optical disk unit while the label surface of the optical disk is directed towards the optical head. The optical disk and head are moved mutually to cover a label area along the plane of the optical disk. In synchronism with the relative movement, the power of a laser beam output from the optical pickup is modulated in accordance with label data constituting an image, such as characters or graphics to be scribed, and the laser beam is emitted onto the visible light characteristic changing layer. As a result of the visible light characteristic changing layer being exposed to the laser beam, a visible-light reflectivity of the visible light characteristic changing layer is changed, thereby forming an image corresponding to the image data on the label surface. According to the document radial positioning of the beam during scribing is based on a radial-direction position sensor for detecting a radial position of the optical pickup on the optical disk. The relative movement mechanism may comprise a radial-direction feed drive device for moving the optical pickup in a radial direction of the optical disk A problem of the known system of label scribing is that the quality of the label is dependent on the radial-direction position sensor.

Therefore it is an object of the invention to provide a device and method for positioning the beam in the transverse direction while scribing a label on a medium at a required quality.

According to a first aspect of the invention the object is achieved with a device as defined in the opening paragraph, which device comprises generator means for, during at least one boundary trace of the substantially parallel traces which precedes or succeeds one of the head movements, temporarily applying a broadening signal to the fine positioning means for broadening the boundary trace in the transverse direction.

According to a second aspect of the invention the object is achieved with a method as defined in the opening paragraph which method comprises the step of, during at least one boundary trace of the substantially parallel traces which precedes or succeeds one of the head movements, temporarily applying a broadening signal to the fine positioning means for broadening the boundary trace in the transverse direction.

The broadening signal is an additional signal for moving the scribing spot in the transverse direction, e.g. a noise signal, a DC signal and/or a periodic signal added to the control signals of a positioning actuator. The effect of applying the broadening signal is that, when a head movement takes place, the boundary trace before and/or after the head movement is broadened. This has the advantage that inaccuracies in the head movement, which otherwise might result in unwritten annular areas called white bands, are masked by the broadened boundary traces.

The invention is also based on the following recognition. The inventors have noted that in an information recording device the optical head and detector are designed for positioning a scanning spot based on error signals from the track. During label scribing, no tracks are available for controlling the transverse position, and the positioning system might be provided with an accurate radial position sensor, as proposed in US 2002/0191517. However, the inventors have seen that a workable transverse positioning for the head may be based on a feed forward system, i.e. applying control signals to the transverse actuators without a feedback signal from a transverse position sensor, or on a less accurate but cheaper sensor. In adverse circumstances such approach may however result in the so-called white banding or in some overlap of traces at the head movements. In particular the white banding appears to be highly degrading to the overall quality of the visible label. By temporarily applying the broadening signal at the head movements visible degrading effects are substantially reduced.

In an embodiment of the device the label control means are arranged for controlling the generator means for, in adjacent boundary traces, controlling the amplitude, phase and/or frequency of the broadening signal for reducing visible degradation of the label due to the broadening signal. The amplitude (e.g. power of a noise signal and/or a DC level), phase and/or frequency (of a periodic signal) are controlled in subsequent adjacent traces based on a pattern, for example the frequency may be varied from trace to trace. This has the advantage that visible effects of the head movement, or of broadening signal itself, are further reduced.

In an embodiment of the device the label control means are arranged for controlling the generator means for controlling the amplitude in adjacent boundary traces to increase in a multitude of the boundary traces preceding the head movement and to decrease in a multitude of the boundary traces succeeding the head movement. This has the advantage that the width of the traces is gradually increased and decreased across the multitude of traces, and is therefore less visible.

In an embodiment of the device the label control means are arranged for controlling the generator means for controlling the amplitude to a predetermined value in the boundary trace preceding the head movement and the boundary trace succeeding the head movement, while controlling the amplitude to a substantially zero value in other traces. This has the advantage that a simple and cost effective control of the amplitude is achieved by applying the predetermined amplitude in just the preceding and the succeeding boundary trace.

Further preferred embodiments of the device and method according to the invention are given in the appended claims, disclosure of which is incorporated herein by reference.

Figure 1B:
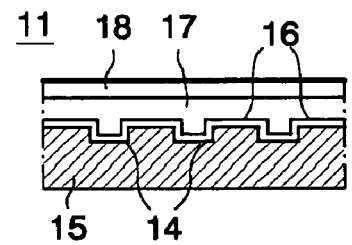
Figure 1C:
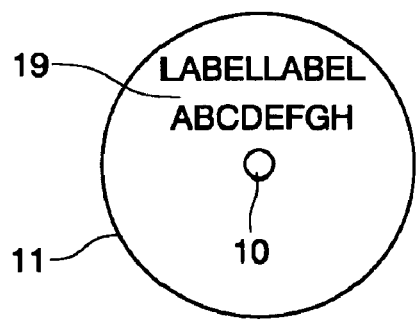
Figure 2:
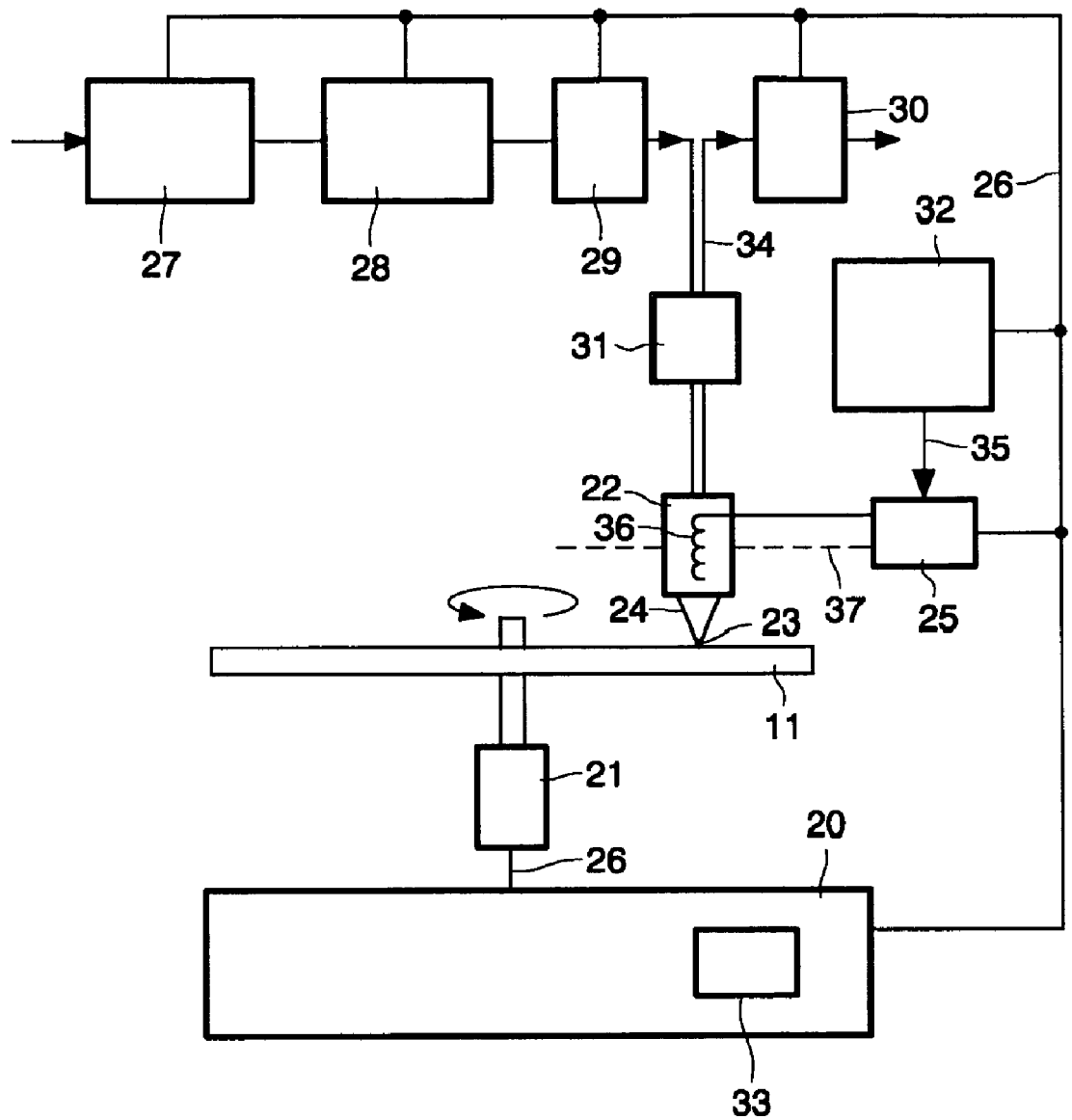
Figure 3:
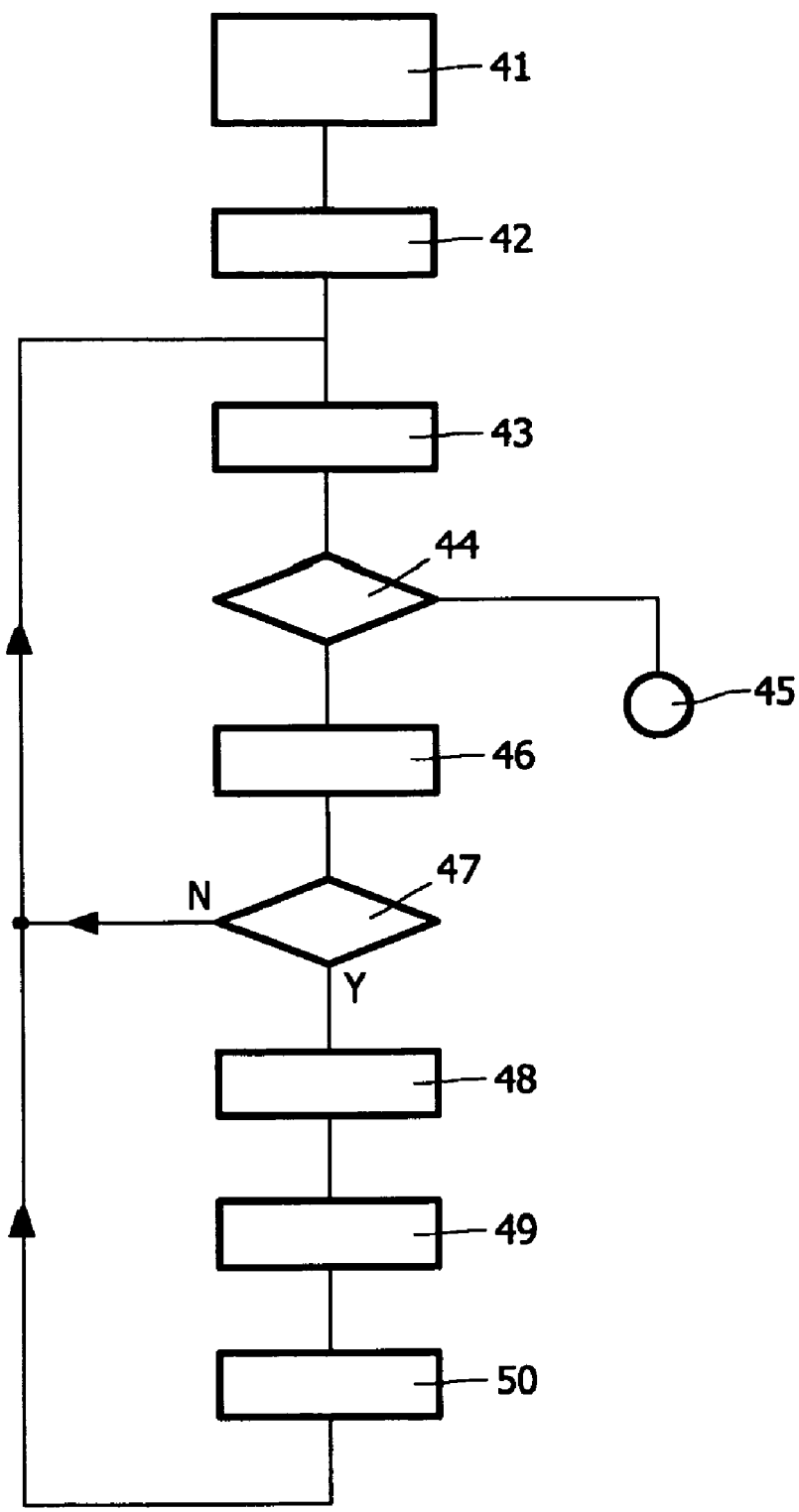

These and other aspects of the invention will be apparent from and elucidated further with reference to the embodiments described by way of example in the following description and with reference to the accompanying drawings, in which FIG. 1a shows a disc-shaped record carrier,
FIG. 1b shows a cross-section taken of the record carrier,
FIG. 1c shows a label on a record carrier,
FIG. 2 shows a scanning device having label scribing, and
FIG. 3 shows a process of label scribing applying broadening.

In the Figures, elements which correspond to elements already described have the same reference numerals.

FIG. 1a shows a disc-shaped record carrier. A cross-section is shown in FIG. 1b, and FIG. 1c shows a label side of the record carrier. The record carrier 11 has a track 9 on an information layer and a central hole 10. The track 9 is arranged in accordance with a spiral or concentrical pattern of turns constituting substantially parallel tracks on the information layer. The record carrier may be an optical disc having an information layer of a recordable type. Examples of a recordable disc are the CD-R and CD-RW, and the DVD-R or DVD+RW, and/or BD (Blu-ray Disc). The track 9 on the recordable type of record carrier is indicated by a pre-embossed track structure provided during manufacture of the blank record carrier, for example a pregroove. Recorded information is represented on the information layer by optically detectable marks recorded along the track. The marks are to be read, and optionally written, via a beam of radiation, e.g. a laser beam generated in an optical head in an optical disk drive. The marks are constituted by variations of one or more physical parameters and thereby have different optical properties than their surroundings, e.g. variations in reflection obtained when recording in materials such as dye, alloy or phase change material, or variations in direction of polarization, obtained when recording in magneto-optical material.

FIG. 1b shows a cross-section taken along the line b-b of the record carrier 11 of the recordable type, in which a transparent substrate 15 is provided with a recording layer 16 and a protective layer 17. The track structure is constituted, for example, by a pregroove 14 which enables an optical head to follow the track 9 during scanning. The pregroove 14 may be implemented as an indentation or an elevation, or may consist of a material having a different optical property. A track structure may also be formed by regularly spread sub-tracks which periodically cause servo signals to occur. The record carrier may be intended to carry real-time information, for example video or audio information, or other information, such as computer data. On top of the protective layer 17a label layer 18 is provided that is sensitive to radiation for scribing a visible label. Scribing is a process of changing the visible light characteristic of the radiation sensitive layer 18 for creating the visible label.

FIG. 1c shows a label on a record carrier. The record carrier 11 is shown from the label side, and a visual label 19 has been scribed in the radiation sensitive layer. The visual label elements, e.g. black dots, are scribed in the label layer 18 by applying a scribing spot and scanning the label layer in radial and angular position while modulating the power of the beam of radiation.

Note that the examples are based on a record carrier that has the radiation sensitive label layer on a different side of the record carrier then the entry side for recording and reading information. However, a label layer of a suitable material may be located at the entry side. Such a label layer has to be at least partly transparent to the radiation for recording and reading information from the marks in the track. Furthermore, the label layer may only be applied to a part of the label side. Obviously label elements can only be scribed at the part covered by the label layer. Furthermore the label layer 18 may be covered by a (further) protective and transparent layer, or may comprise various materials for providing different colors.

FIG. 2 shows a recording device having label scribing. The device is provided with means for scanning a record carrier 11, which means include a drive unit 21 for rotating the record carrier 11, a head 22, a positioning unit 25 for radially positioning the head 22 and a control unit 20. The head 22, also called OPU (Optical Pickup Unit), comprises an optical system of a known type for generating a radiation beam 24 guided through optical elements focused to a radiation spot 23. The radiation beam 24 is generated by a radiation source, e.g. a laser diode.

In a data recording mode the radiation spot is generated on a track of the information layer of the record carrier. In a label scribing mode the radiation spot is focused on the radiation sensitive layer on the label side of the medium 11. The head further comprises a focusing actuator for focusing the beam to the radiation spot by moving the focus of the radiation beam 24 along the optical axis of said beam, and a radial actuator 36 for fine positioning of the spot 23 in a radial direction, e.g. coils for radially moving an optical element.

The radiation reflected from the medium is detected by a detector of a usual type in the head 22. A front-end unit 31 is coupled to the detector for providing detector signals based on radiation reflected from the track. The detector signals may include a main scanning signal 34 for reading the marks and detector signals for focusing and radially positioning the scanning spot, as is well known from the CD or DVD system. The main scanning signal 34 is processed by read processing unit 30 of a usual type including a demodulator, deformatter and output unit to retrieve the information. For the label mode the detector signals for radially positioning are not available, because no tracks are present on the label layer. Radially positioning during label mode is described below in detail.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

The device may be provided with recording means for recording information on record carriers of a writable or re-writable type. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the power of the beam of radiation is controlled by modulator 29 to create the optically detectable marks in the recording layer.

In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 is for controlling the recording in the recording mode. The control unit comprises a label control unit 33 for controlling the scribing in the label mode. Label data to be scribed may be provided via a host interface, or by user input, to the label control unit. In an embodiment a scanning device may be arranged only for label writing. The device is similar to the above device for recording, but the elements for data recording and retrieval are omitted.

In practice the idea in label mode is to scribe labels at the non-data side of a CD or DVD disc. A laser in the optical head may be used to write the label, for example the CD or DVD laser. Both radial and focus control is performed open loop. In the label mode the record carrier is to be entered in the device with its label side towards the optical head to allow the beam of radiation to be focused to a scribing spot on the radiation sensitive layer. When a record carrier is entered, the user may give a command to engage the label mode. Alternatively the device may automatically detect if a suitable record carrier for label write has been entered, for example by detecting prescribed marks on a predefined location on the record carrier.

An angular position of the head may be measured based on accurately controlling and measuring the rotation of the record carrier from a known reference position. Thereto the record carrier may have additional marks on the label side, such as a barcode, which may be detected by the head or by an additional sensor. Also the angular position may be based on motor control signals, motor response signals or sensor signals, for example, from a Hall sensor coupled to a turntable motor, as described in a co-pending application of the current applicant (PHNL040725).

Focusing on the label might be performed using a method that is based on maximizing the reflectivity, which is measured from the so-called central aperture (CA) signal. This signal is sometimes called the sum signal. Basically it is the signal that describes the amount of light reflected from the disc.

It is noted that the positioning unit 25 is, in the label mode, for positioning the scribing spot in a transverse direction (usually called radial for a disc) that is transverse to a longitudinal direction of the traces of dots. The positioning unit 25 includes course positioning elements 37 for course positioning the scribing spot in the transverse direction by movements of the head, e.g. a movable sledge or arm carrying the head. A radial course position system for the head may be based on a stepping motor for movements of the head in equal sized, numbered, steps, or may be based on a rotation sensor coupled to a motor for moving a sledge carrying the head along a spindle, or two supporting axis and a gear-rack system to move the sledge. The positioning unit 25 further includes fine positioning elements for fine positioning the scribing spot in the transverse direction, e.g. the actuator 36 coupled to an optical element affecting the beam like an objective lens. The label control unit 33 is controlling the transverse positioning during label mode.

In the label mode, for radial positioning during scribing a pattern of substantially parallel traces, the label control unit 33 provides, at stepwise intervals, a head movement control signal to the positioning unit 25 which indicates that a movement of the head via the course positioning system is to be executed. During such a stepwise interval, i.e. in between head movements, the head is substantially stable, while the transverse movement of the scribing spot is substantially only controlled by the fine positioning system. When executing the head movement, the scribing spot is controlled to effectively make only a small forward step to a next trace. The large head movement forward step is compensated by a corresponding counteractive signal applied to the fine positioning system, i.e. a large backward step with respect to the head.

A boundary trace is a trace in the pattern just before or just after executing the head movement and the corresponding large backward step. It has been noted that, in practice, the forward step of the head or the corresponding large backward step of the fine positioning elements may not be fully compensatory, e.g. due to production spread of the actuator and motor, variations of temperature, wear, hysteresis, etc. Subsequently the boundary traces just before or just after executing the head movement, which should be directly adjacent, are separated by an unwritten area, called white band, or may slightly overlap. In particular the white band appears to be clearly visible and reduces the overall perceived quality of the label. In the current document a boundary area is the annular area comprising the forward step of the head and the boundary traces surrounding the forward step, and in particular including the traces to which a broadening signal is applied as described hereafter.

The device is provided with a signal generator unit 32 for providing a broadening signal 35 to the positioning unit 25. In particular the broadening signal 35 is temporarily applied to the fine positioning system for broadening the boundary trace in the transverse direction at a movement of the head, during at least one boundary trace of the substantially parallel traces which boundary trace precedes or succeeds the head movement. Thereto the label control unit 33 detects the imminent head movement, and controls the signal generator unit 32 for, during one or more selected boundary traces, applying the broadening signal.

The broadening signal may be a digital control signal indicating to the fine positioning system to vary the transverse position of the scribing spot, e.g. indicating amplitude, frequency and/or phase of variation in the transverse direction. Alternatively the signal generator unit 32 may provide a varying signal to be added to drive signals of the radial actuator 36.

The broadening signal as a perturbing signal may be formed by one or more signal components, for example a noise signal component, a DC component, and/or a periodic wobble or pulse signal. In particular, besides adding noise and/or periodic signals, adding a DC component may be advantageous. The DC component moves the spot 'off-track' with respect to the centre of the trace. A few traces, lets say 20, before a course step the DC component could grow, e.g. from 0 to 10 micron. After the course step the DC should decrease from −10 micron to 0 during a similar number of traces. In a practical embodiment the amplitude of the broadening signal is selected to create a transverse variation of 10% to 50% of the pitch between the traces, or, if necessary due to large mechanical tolerances, even to values larger then the track pitch, e.g. 150% or more.

In an embodiment the signal generator unit 32 is a programmable signal generator that generates the broadening signal, which may include a periodic component of which frequency, pulse shape, amplitude and optionally phase of a periodic signal are selected, and further components like noise or DC of which power level, etc are set. The programmable signal generator may be implemented in firmware. The label control unit 33 is arranged for controlling the generator unit 32 for, in adjacent boundary traces, controlling the amplitude, phase and/or frequency of the broadening signal for reducing visible degradation of the label due to the broadening signal. For example the phase may be selected to be locked to the angular position, or, alternatively, frequency and/or phase may be selected to behave different in adjacent boundary traces. In an embodiment the overall amplitude in adjacent boundary traces may be set to increase in a multitude of the boundary traces preceding the head movement and to decrease in a multitude of the boundary traces succeeding the head movement. By such a gradual pattern of increase and decrease no sharp boundary between traces with, and without, broadening signal will be visible. For example the amplitude may be set to increase at 25%, 50%, 75% and 100%, and subsequently to decrease at 100%, 75%, 50% and 25%.

Alternatively, in a less complex embodiment, the label control unit 33 is arranged for controlling the generator unit 32 for, in adjacent boundary traces, controlling the amplitude to a predetermined value in the boundary trace preceding the head movement and the boundary trace succeeding the head movement, while controlling the amplitude to a substantially zero value in other traces.

In an embodiment of the device the label control unit 33 is arranged for controlling a power of the beam of radiation to be adapted for to a higher value in the boundary trace for compensating the increase in length of the boundary trace due to the broadening signal. In practice, for scribing a colored dot in the label layer, an amount of radiation energy is required for locally affecting the radiation sensitive layer, e.g. by heating, which amount is now called scribe power. The scribe power may be preset, selected after detecting a type of the label layer, or measured by making test spots. However, due to the broadening signal, the scribing spot travels faster and a longer distance. For compensating the scribe power is increased, the increase preferably corresponding to said increase in speed and distance.

In an embodiment the control unit 20 is arranged for detecting a type of the medium, and the label control means 33 are arranged for controlling the generator unit 32 in dependence of the type of the medium that has been detected. For example the amplitude, phase and/or frequency of the broadening signal are selected for the detected label layer type. Also the power of the scribing spot may be set based on the detected type of the label layer.

FIG. 3 shows a process of label scribing applying broadening. In a first step PREPARE 41 a command to start the label scribing mode is received, and label data may be received or actively gathered, and is prepared for scribing in traces of dots according to a pattern of scanning the medium, e.g. radial traces on a disc shaped medium, or linear traces on a rectangular medium. In step INT POSITION 42 the head and medium are positioned in a first starting position of the first trace to be scribed. The positioning relates only to positioning in the transverse direction. Scanning along the longitudinal direction of the trace is performed while modulating the power of the beam for scribing the dots (not further discussed here). Now a repetitive loop follows: scribing a trace in step SCRIBE 43, moving the scribing spot to the next adjacent trace in step FINE 46, testing if all traces of the label have been completed in TEST 44 and, if so, terminating the label mode in END 45. In the loop a further test is included in step 47 BOUNDARY to detect if a head movement is imminent, i.e. required within a next few traces called a boundary number of traces. The boundary number of traces is the number of traces that receive the broadening signal before the head movement as described above. For example the boundary number may be one (or even zero), or a few traces for a pattern of increasing broadening signals. If the boundary area is entered in step BOUNDARY 47, the subsequent traces are scribed while applying the broadening signal in step BROAD_PRE 48. Subsequently the large head movement is performed in step HEAD 49, while at the same time applying the large backward step to the fine positioning means as described above. In step BROAD_POST 50 again a boundary number of traces are scribed while applying the broadening signal, e.g. applying decreasing amplitude of the broadening signal. Note that in BROAD_PRE and BROAD_POST a number of small forward steps by the fine positioning means may be performed to scribe adjacent traces, while adjusting the broadening signal at each step. The scribing of traces without broadening is then resumed at the loop described above.

Although the invention has been mainly explained by embodiments using optical discs having a label layer, the invention is also suitable for other record carriers such as rectangular optical cards, magneto-optical discs or any other type of medium that may be scanned via a beam of radiation. Note that the scanning may be effected by moving the medium, but also by moving the head, or both, to affect the scanning pattern. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for scribing a visible label on a medium (11), the medium having a label side provided with a radiation sensitive layer for creating the visible label by scribing a pattern of substantially parallel traces of dots via a beam of radiation (24), the device comprising
   a head (22) for providing the beam of radiation for generating a scribing spot on the radiation sensitive layer for scribing the visible label,
   a control unit (20) comprising label control means (33) for controlling the scribing in dependence of label data, and
   positioning means (25) for positioning the scribing spot in a transverse direction that is transverse to a longitudinal direction of the traces of dots, which positioning means (25) comprise course positioning means for course positioning the scribing spot in the transverse direction by movements of the head and fine positioning means for fine positioning the scribing spot in the transverse direction, and
   generator means (32) for, during at least one boundary trace of the substantially parallel traces which precedes or succeeds one of the head movements, temporarily applying a broadening signal (35) to the fine positioning means for broadening the boundary trace in the transverse direction.

2. Device as claimed in claim 1, wherein generator means (32) are arranged for applying at least one of a periodic signal component, a noise signal component, or a DC signal component to constitute the broadening signal (35).

3. Device as claimed in claim 2, wherein the label control means (33) are arranged for controlling the generator means (32) for, in adjacent boundary traces, controlling the amplitude, phase and/or frequency of the broadening signal for reducing visible degradation of the label due to the broadening signal.

4. Device as claimed in claim 3, wherein the label control means (33) are arranged for controlling the generator means (32) for controlling the amplitude in adjacent boundary traces to increase in a multitude of the boundary traces preceding the head movement and to decrease in a multitude of the boundary traces succeeding the head movement.

5. Device as claimed in claim 3, wherein the label control means (33) are arranged for controlling the generator means (32) for controlling the amplitude to a predetermined value in the boundary trace preceding the head movement and the boundary trace succeeding the head movement, while controlling the amplitude to a substantially zero value in other traces.

6. Device as claimed in claim 1, wherein the label control means (33) are arranged for controlling a power of the beam of radiation to be adapted for to a higher value in the boundary trace for compensating the increase in length of the boundary trace due to the broadening signal.

7. Device as claimed in claim 1, wherein the control unit (20) is arranged for detecting a type of the medium, and the label control means (33) are arranged for controlling the generator means (32) in dependence of the type of the medium that has been detected.

8. Method of scribing a visible label on a medium via a beam of radiation for use in a scanning device,
the medium having a label side provided with a radiation sensitive layer for creating the visible label by scribing a pattern of substantially parallel traces of dots via a beam of radiation,
the device comprising
a head (22) for providing the beam of radiation for generating a scribing spot on the radiation sensitive layer for scribing the visible label,
positioning means (25) for positioning the scribing spot in a transverse direction that is transverse to a longitudinal direction of the traces of dots, which positioning means (25) comprise course positioning means for course positioning the scribing spot in the transverse direction by movements of the head and fine positioning means for fine positioning the scribing spot in the transverse direction, and
the method comprising the step (48,50) of, during at least one boundary trace of the substantially parallel traces which precedes or succeeds one of the head movements, temporarily applying a broadening signal to the fine positioning means for broadening the boundary trace in the transverse direction.

* * * * *